US010930236B2

(12) United States Patent
Lee et al.

(10) Patent No.: US 10,930,236 B2
(45) Date of Patent: Feb. 23, 2021

(54) GATE DRIVER AND DISPLAY DEVICE HAVING THE SAME

(71) Applicant: SAMSUNG DISPLAY CO., LTD., Yongin-si (KR)

(72) Inventors: Kyung-Hun Lee, Yongin-si (KR); Jahun Koo, Asan-si (KR); Ho Lee, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/406,427

(22) Filed: May 8, 2019

(65) Prior Publication Data

US 2019/0348007 A1 Nov. 14, 2019

(30) Foreign Application Priority Data

May 9, 2018 (KR) ........................ 10-2018-0052951

(51) Int. Cl.
*G06F 3/038* (2013.01)
*G09G 5/00* (2006.01)
*G09G 3/36* (2006.01)

(52) U.S. Cl.
CPC ... *G09G 3/3648* (2013.01); *G09G 2310/0264* (2013.01); *G09G 2310/08* (2013.01); *G09G 2320/0276* (2013.01); *G09G 2320/0673* (2013.01); *G09G 2330/021* (2013.01)

(58) Field of Classification Search
CPC .... G09G 2310/0286; H01L 2924/0002; H01L 27/1225
See application file for complete search history.

(56) References Cited

U.S. PATENT DOCUMENTS

2011/0210324 A1* 9/2011 Sakakura ............ H01L 27/1225 257/43
2012/0320019 A1* 12/2012 Jeong .................. G09G 3/3648 345/211
2014/0300399 A1* 10/2014 Miyake ................. G11C 19/28 327/296

FOREIGN PATENT DOCUMENTS

KR 1020160073928 6/2016
KR 1020170017054 2/2017

* cited by examiner

*Primary Examiner* — Nan-Ying Yang
(74) *Attorney, Agent, or Firm* — F. Chau & Associates, LLC

(57) ABSTRACT

Stages of a gate driver may each receive a clock signal, an inverted clock signal, a previous carry signal and a subsequent carry signal, and may each include an output part, a node controlling part and a holding part. In a mode transition period, clock signal and the inverted clock signal may both be temporarily applied with on voltages. The holding parts of the stages receive the clock signal and the inverted clock signal each having the on voltage, and in response, discharge the control nodes, the gate output nodes and the carry output nodes, thereby preventing faulty operation.

19 Claims, 10 Drawing Sheets

GATE DRIVER AND DISPLAY DEVICE HAVING THE SAME

CROSS-REFERENCE TO RELATED APPLICATION

This application claims priority under 35 USC § 119 to Korean Patent Application No. 10-2018-0052951, filed on May 9, 2018 in the Korean Intellectual Property Office (KIPO), the contents of which are incorporated herein by reference in its entirety.

1. TECHNICAL FIELD

Example embodiments relate generally to display devices. More particularly, example embodiments relate to gate drivers and display devices including the gate drivers.

2. DISCUSSION OF THE RELATED ART

Generally, a display device may include a display panel and a panel driver. The display panel may include a plurality of gate lines and a plurality of data lines. The panel driver may include a data driver providing data voltages to the data lines, and a gate driver providing gate signals to the gate lines.

The gate driver may include a plurality of stages that sequentially output the gate signals. Each stage may charge an internal control node, and may output the gate signal to a gate line, and a carry signal to a subsequent stage, based on a voltage of the charged control node. A pulse edge of the carry signal may trigger the outputting of a gate signal of the subsequent stage. An operating mode of a display device may transition, for example, from a normal mode, in which an image signal corresponding to an externally provided image data is displayed, to a fail mode, in which a black screen or a predetermined pattern is displayed. This operating mode transition may be due to an error in input image data that occurs during a frame period in the normal mode. When the transition occurs, the control node of at least a portion of the stages may be in a charged state, which results in an abnormal (faulty) operation of the gate driver.

SUMMARY

Example embodiments provide a display device including a gate driver capable of preventing an abnormal operation caused by an operating mode change.

According to some example embodiments, there is provided a gate driver included in a display device including a plurality of stages that sequentially output a plurality of gate signals. At least some of the plurality of stages includes an output circuit part configured to output a gate signal of the gate signals to a gate output node and a carry output node in response to a voltage of a control node, where the gate signal and the carry signal each have a pulse synchronized with a pulse of a clock signal. A node controlling circuit part is configured to pull up the control node in response to a previous carry signal output in synchronization with an inverted clock signal inverted from the clock signal, and to pull down the control node in response to a subsequent carry signal output in synchronization with a delayed inverted clock signal delayed with respect to the inverted clock signal. A holding circuit part configured to hold the control node at a second off voltage in response to the clock signal, to hold the gate output node at a first off voltage in response to the inverted clock signal, and to hold the carry output node at the second off voltage in response to the inverted clock signal. In a mode transition period, the holding parts receive the clock signal having an on voltage maintained throughout at least one clock cycle, and the inverted clock signal having the on voltage maintained throughout the at least one clock cycle, and in response, and discharge the control nodes, the gate output nodes and carry output nodes.

In various example embodiments:

When an operating mode of the display device is changed from a first mode to a second mode, the mode transition period may correspond to an initial period of the second mode in which a data signal is not output.

The first mode may be a normal mode, and the second mode may be a fail mode.

A normal image may be displayed based on input image data received from an external device in the normal mode, and a black image or a pattern image may be displayed based on black data or pattern data stored in the display device in the fail mode.

The first mode may correspond to a first frame rate or a first resolution, and the second mode may correspond to a second frame rate different from the first frame rate or a second resolution different from the first resolution.

In a blank period, at least one of the clock signal and the inverted clock signal may have an off voltage.

In a blank period, the clock signal and the inverted clock signal may have a charge shared voltage.

The clock signal may be one of K clock signals received by the gate driver, where the K clock signals have sequentially delayed phases. The inverted clock signal may be one of K inverted clock signals that are respectively inverted from the K clock signals, where K is an integer greater than 1. An N-th one of the plurality of stages may receive, as the previous carry signal, the carry signal of an (N−K)-th one of the plurality of stages, and may receive, as the subsequent carry signal, the carry signal of an (N+K+L)-th one of the plurality of stages, where N is an integer greater than K, and L is an integer greater than 0 and less than K.

The output part may include a first transistor including a gate terminal connected to the control node, a first terminal receiving the clock signal, and a second terminal connected to the gate output node, and a second transistor including a gate terminal connected to the control node, a first terminal receiving the clock signal, and a second terminal connected to the carry output node.

The output part may further include a capacitor including a first electrode connected to the control node, and a second electrode to the gate output node.

The node controlling part may include a third transistor including a gate terminal receiving the previous carry signal, a first terminal receiving the previous carry signal, and a second terminal connected to the control node, and a fourth transistor including a gate terminal receiving the subsequent carry signal, a first terminal connected to the control node, and a second terminal receiving the second off voltage.

The holding part may include a fifth transistor including a gate terminal receiving the clock signal, a first terminal connected to the control node, and a second terminal connected to the carry output node, a sixth transistor including a gate terminal receiving the inverted clock signal, a first terminal connected to the gate output node, and a second terminal receiving the first off voltage, and a seventh transistor including a gate terminal receiving the inverted clock signal, a first terminal connected to the carry output node, and a second terminal receiving the second off voltage.

According to some example embodiments, there is provided a gate driver included in a display device including a plurality of stages that sequentially output a plurality of gate signals. At least some of the plurality of stages includes a first transistor including a gate terminal connected to a control node, a first terminal receiving a clock signal, and a second terminal connected to a gate output node, a second transistor including a gate terminal connected to the control node, a first terminal receiving the clock signal, and a second terminal connected to a carry output node, a third transistor including a gate terminal receiving a previous carry signal having a pulse output in synchronization with a pulse of an inverted clock signal inverted from the clock signal, a first terminal receiving the previous carry signal, and a second terminal connected to the control node, a fourth transistor including a gate terminal receiving a subsequent carry signal that is output in synchronization with a delayed inverted clock signal delayed with respect to the inverted clock signal, a first terminal connected to the control node, and a second terminal receiving a second off voltage, a fifth transistor including a gate terminal receiving the clock signal, a first terminal connected to the control node, and a second terminal connected to the carry output node, a sixth transistor including a gate terminal receiving the inverted clock signal, a first terminal connected to the gate output node, and a second terminal receiving a first off voltage, and a seventh transistor including a gate terminal receiving the inverted clock signal, a first terminal connected to the carry output node, and a second terminal receiving the second off voltage. In a mode transition period, the fifth transistors discharge the control nodes in response to the clock signal having an on voltage, and, in response to the inverted clock signal having the on voltage, the sixth transistors discharge the gate output nodes, and the seventh transistors of the plurality of stages discharge the carry output nodes.

In some example embodiments, when an operating mode of the display device is changed from a normal mode to a fail mode, the mode transition period may correspond to an initial period of the fail mode in which a data signal is not output.

According to some example embodiments, there is provided a display device including a display panel including a plurality of pixels, a data driver configured to apply data voltages to the pixels, a timing controller configured to generate a vertical clock signal, a power management circuit configured to generate a clock signal and an inverted clock signal based on the vertical clock signal, and a gate driver including a plurality of stages that sequentially output a plurality of gate signals to the pixels in response to the clock signal and the inverted clock signal. In a mode transition period, the power management circuit outputs each of the clock signal and the inverted clock signal at an on voltage maintained throughout at least one clock cycle, which causes the plurality of stages to discharge control nodes, gate output nodes and carry output nodes of the plurality of stages.

In various embodiments:

The timing controller may transfer a masking detection signal to the power management circuit, and the masking detection signal may be activated during the mode transition period. The power management circuit may change the clock signal and the inverted clock signal to the on voltage in response to the masking detection signal.

The timing controller may transfer a command to the power management circuit through an inter-integrated circuit (I2C) communication, and the power management circuit may change the clock signal and the inverted clock signal to the on voltage in response to the command.

The timing controller may transfer a gate control signal representing that the clock signal and the inverted clock signal are to be toggled to the power management circuit, and the power management circuit may change the clock signal and the inverted clock signal to the on voltage when a time of an inactive period of the gate control signal reaches a predetermined threshold time.

The timing controller may transfer a data enable signal representing that a data signal is output to the data driver. The power management circuit may count a time duration of the data enable signal, and may change the clock signal and the inverted clock signal to the on voltage when the time duration exceeds a predetermined normal range.

A gate driver and display device according to example embodiments may discharge, in the mode transition period, the control nodes, the gate output nodes, and the carry output nodes of the plurality of stages using the clock signal and the inverted clock signal each having the on voltage, thereby preventing an abnormal operation of the gate driver.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF EMBODIMENTS

Figure 1:
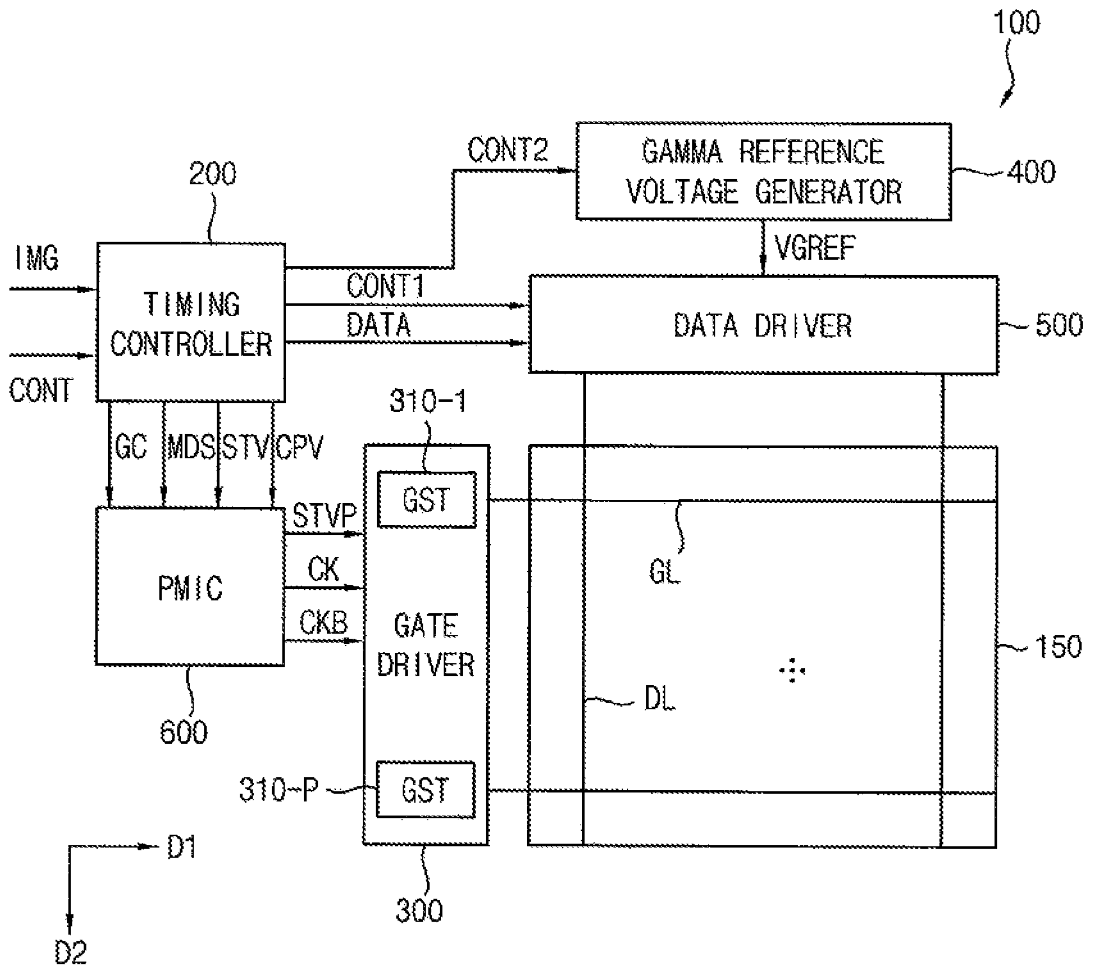
FIG. 1 is a block diagram illustrating a display device according to example embodiments.

Example embodiments are described more fully hereinafter with reference to the accompanying drawings. Like or similar reference characters refer to like or similar elements throughout.

FIG. 1 is a block diagram illustrating a display device, 100, according to example embodiments, which includes a display panel 150 for displaying images. Display device 100 may further include a timing controller 200, a gate driver 300, a gamma reference voltage generator 400, a data driver 500 and a power management (integrated) circuit (PMIC)

600, each of which may be circuitry forming part of a common or individual integrated circuit (IC).

The display panel 150 may have a display portion where an image is displayed, and a peripheral portion adjacent to the display portion. The display panel 150 may include a plurality of gate lines GL, a plurality of data lines DL and a plurality of pixels connected to the data lines DL and the gate lines GL. The gate lines GL may extend in a first direction D1, the data lines DL may extend in a second direction D2 crossing the first direction D1, and the pixels may be disposed in a matrix form. The display panel 150 may be a liquid crystal display (LCD) panel, where each pixel may include a switching element, and a liquid crystal capacitor and a storage capacitor connected to the switching element. Other types of displays may alternatively be utilized.

The timing controller 200 may control an operation timing of the display device 100. The timing controller 200 may generate control signals CONT1, CONT2, GC, MDS, STV and CPV and a data signal DATA based on input image data and an input control signal CONT received from an external device (e.g., a graphic processing unit (GPU)). The input image data IMG may include red image data, green image data and blue image data, and the input control signal CONT may include a master clock signal, a data enable signal, a vertical synchronization signal, a horizontal synchronization signal, etc.

The timing controller 200 may generate a first control signal CONT1 for controlling an operation of the data driver 500 and the data signal DAM based on the input image data IMG and the input control signal CONT, and may provide the first control signal CONT1 and the data signal DATA to the data driver 500. Further, the timing controller 200 may generate a second control signal CONT2 for controlling an operation of the gamma reference voltage generator 400 based on the input control signal CONT, and may provide the second control signal CONT2 to the gamma reference voltage generator 400.

Further, the timing controller 200 may generate control signals GC, MDS, STV and CPV for controlling an operation of the gate driver 300 based on the input control signal CONT. The control signals GC, MDS, STV and CPV generated by the timing controller 200 may be converted by the power management circuit 600 into control signals STVP, CK and CKB suitable for the gate driver 300 and the control signals STVP, CK and CKB converted by the power management circuit 600 may be provided to the gate driver 300. The control signals GC, MDS, STV and CPV generated by the timing controller 200 may include, but are not limited to, a gate control signal GC representing that a clock signal CK and an inverted clock signal CKB are to be toggled, a vertical start signal STV, a vertical clock signal CPV, and a masking detection signal MDS which is activated during a mode transition period.

The gamma reference voltage generator 400 may generate a gamma reference voltage VGREF based on the second control signal CONT2 received from the timing controller 200, and may provide the gamma reference voltage VGREF to the data driver 500. The gamma reference voltage VGREF may have a voltage level corresponding to each gray level. The gamma reference voltage generator 400 may be configured and disposed independently as depicted in FIG. 1, but may alternatively be disposed within the timing controller 200, within the data driver 500, or within another circuit block.

The data driver 500 may receive the first control signal CONT1 and the data signal DATA from the timing controller 200, and may receive the gamma reference voltage VGREF from the gamma reference voltage generator 400. The data driver 500 may convert the data signal DATA into an analog data voltage using the gamma reference voltage VGREF, and output the data voltage to the data line DL. The data driver 500 may be mounted directly on the display panel 150; may be connected to the display panel 150 in a form of a tape carrier package TCP; may be integrated in the peripheral portion of the display panel 150; or may be packaged in alternative ways.

The power management circuit 600 may supply power to the display device 100, and may convert the control signals GC, MDS, STV and CPV generated by the timing controller 200 into the control signals STVP, CK and CKB suitable for the gate driver 300. For example, the power management circuit 600 may generate an improved vertical start signal STVP by adjusting a voltage level of the vertical start signal STV corresponding to the gate driver 300, and may generate at least one clock signal CK and at least one inverted clock signal CKB based on the gate control signal GC and the vertical clock signal CPV. In some cases, the control signals STVP, CK and CKB may be modified by circuitry within the PMIC 600 or the gate driver 300 to have signal levels suitable for the gate driver 300.

The gate driver 300 may generate gate signals for driving the gate lines GL based on the control signals STVP, CK and CKB received from the power management circuit 600, e.g., the improved vertical start signal STVP, the clock signal CK and the inverted clock signal CKB. The gate driver 300 may include a plurality P of gate line driving stages GST 310-1 to 310-P (hereafter, just "stages"), each for driving a respective one of the gate lines GL. In some example embodiments, the gate driver 300 may be implemented as an amorphous silicon gate (ASG) driver using an amorphous silicon thin film transistor (a-Si TFT), and may be integrated in the peripheral portion of the display panel 150. In other example embodiments, the gate driver 300 may be implemented using an oxide semiconductor, a crystalline semiconductor, a polycrystalline semiconductor, etc., and may be integrated in the peripheral portion of the display panel 150. In still other example embodiments, the gate driver may be implemented as a TCP or a chip on film (COF).

Figure 2:
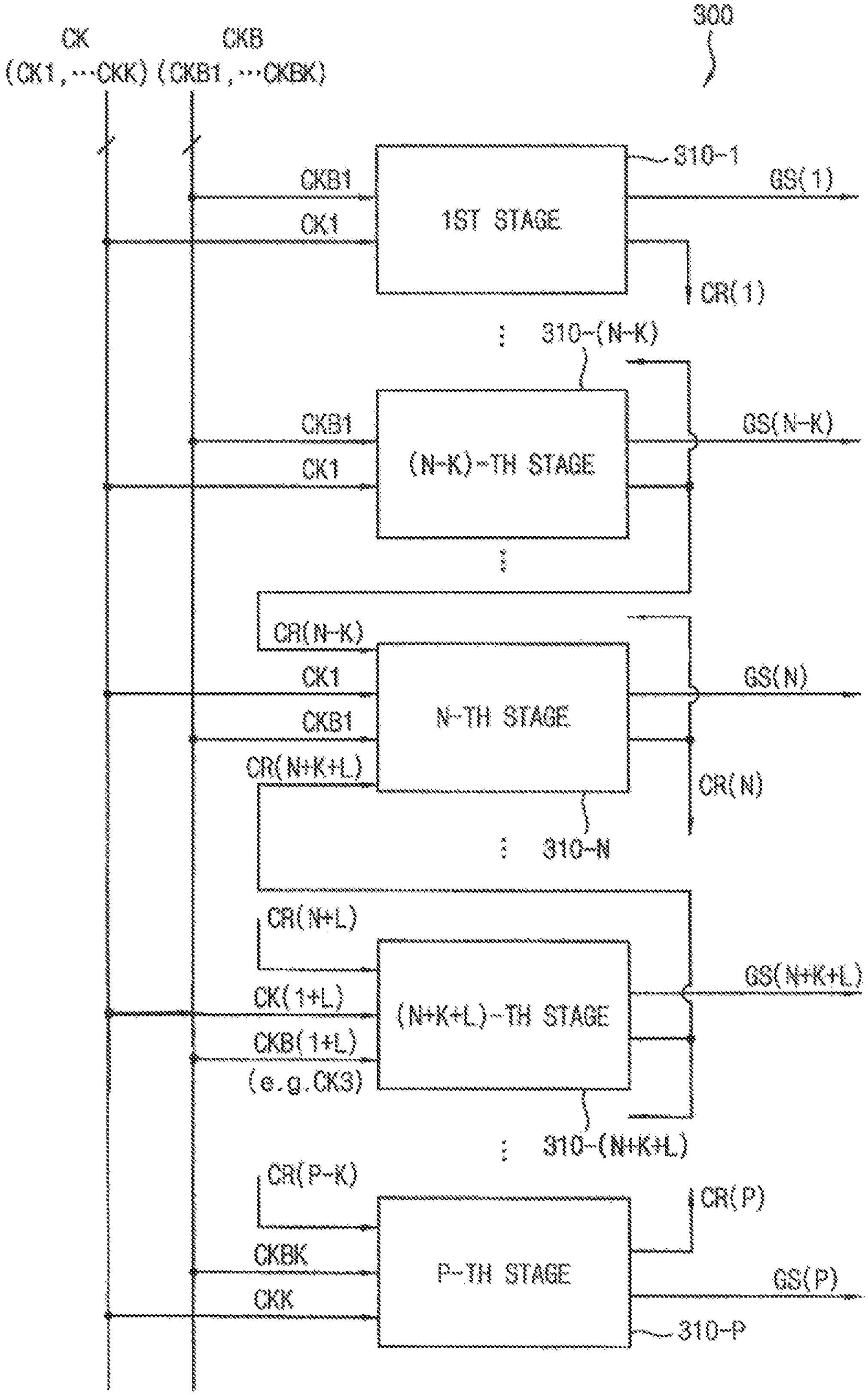
FIG. 2 is a block diagram illustrating example stages of a gate driver illustrated in FIG. 1.
Figure 3:
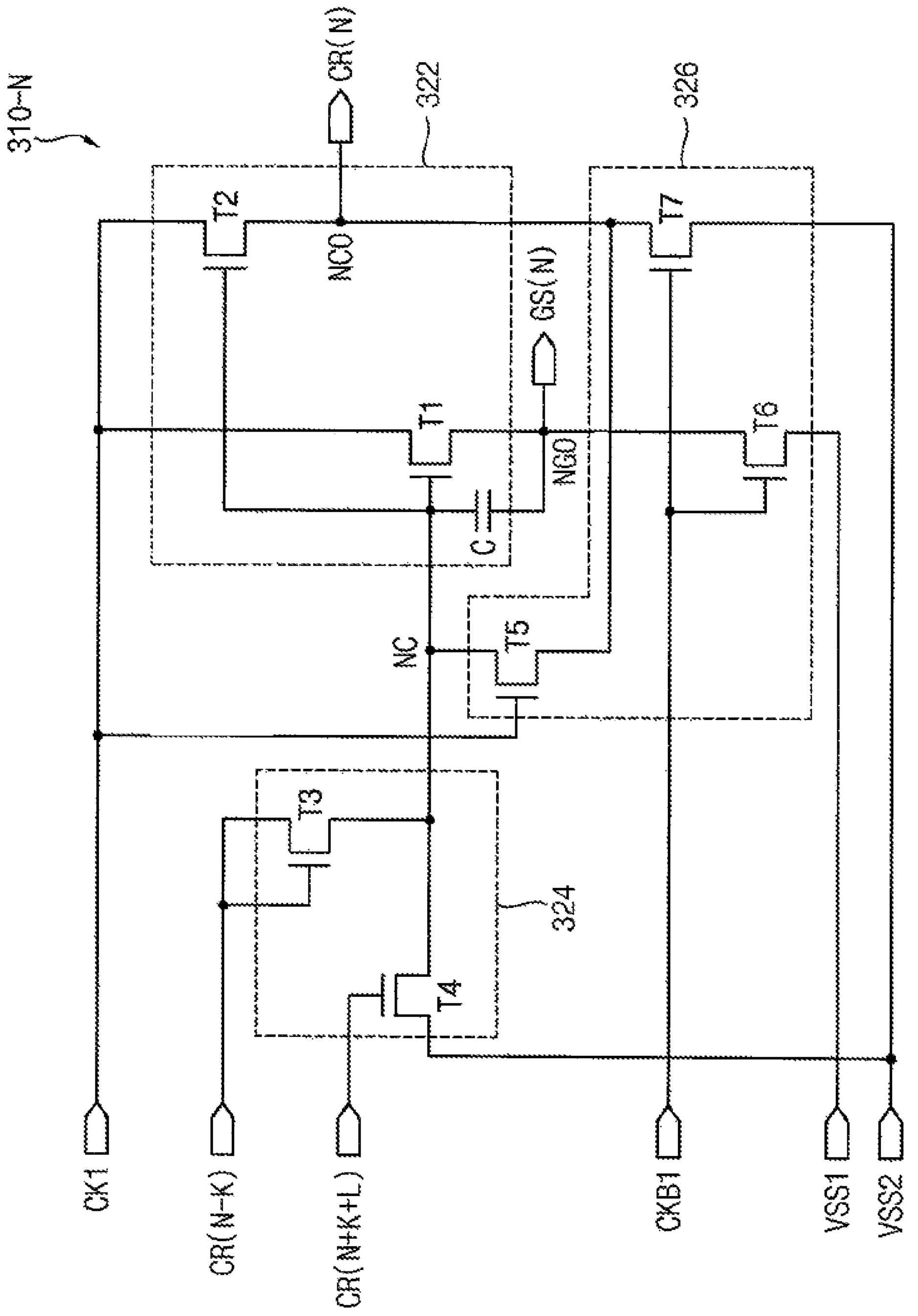
FIG. 3 is a circuit diagram illustrating an example of an N-th stage illustrated in FIG. 2.
Figure 4:
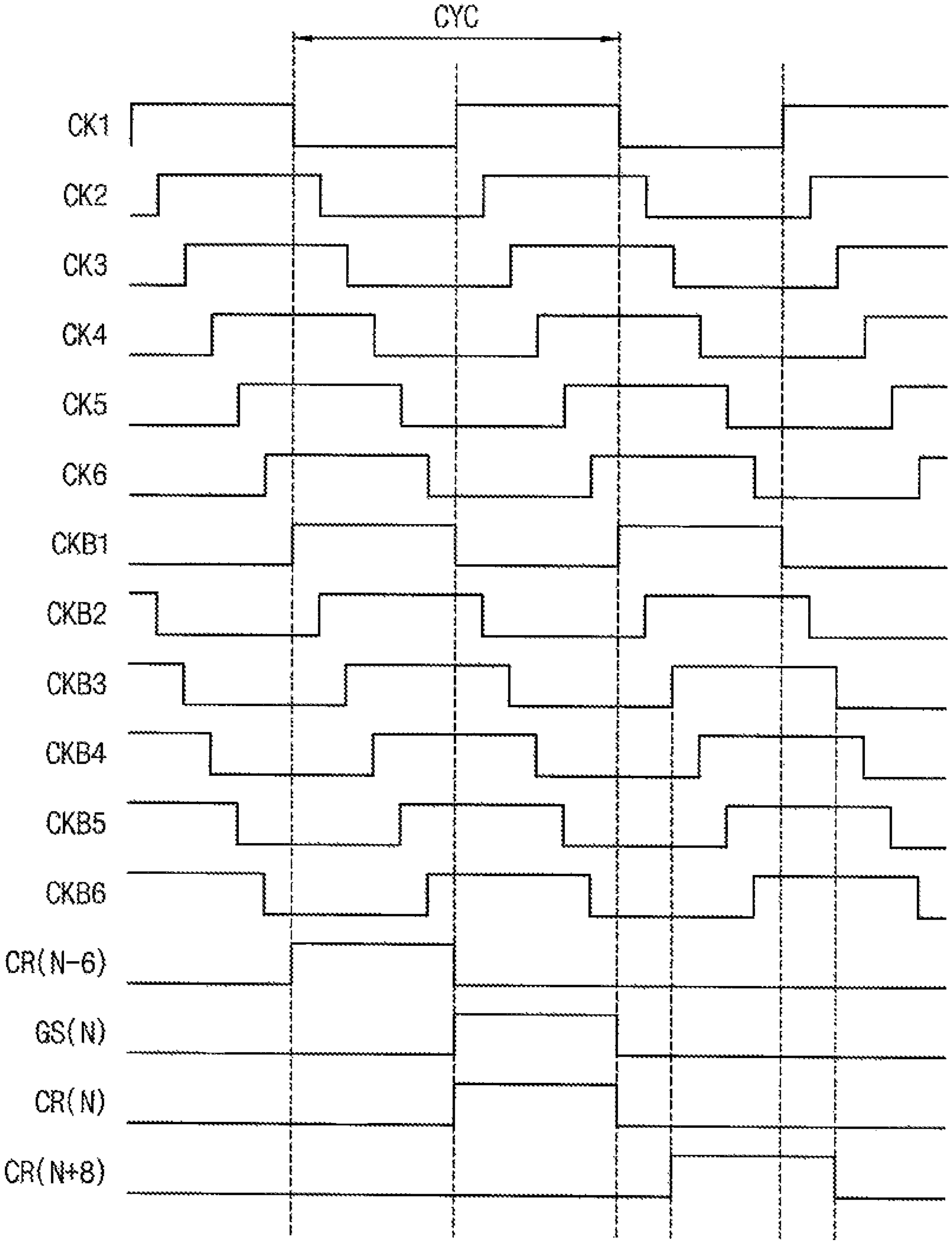
FIG. 4 is a timing diagram for describing an example of an operation of an N-th stage of FIG. 3.

FIG. 2 is a block diagram illustrating stages of a gate driver illustrated in FIG. 1. FIG. 3 is a circuit diagram illustrating an example of an N-th stage illustrated in FIG. 2. FIG. 4 is a timing diagram for describing an example of an operation of an N-th stage of FIG. 3. Referring collectively to FIGS. 1-4, the gate driver 300 may include the plurality of stages 310-1 to 310-P, which sequentially output a plurality of gate signals GS(1) to GS(P) and a plurality of carry signals CR(1) to CR(P), respectively. In the following discussion, stages 310-(N−K), 310-N, and 310-(N+K+L) will be discussed as examples to explain certain aspects of the inventive concept; these stages may output gate signals GS(N−K), GS(N) and GS(N+K+L), respectively. The gate driver 300 may receive, as the clock signal CK, K clock signals CK1, . . . , CKK having sequentially delayed phases; and may receive, as the inverted clock signal CKB, K inverted clock signals CKB1, . . . , CKBK respectively inverted from the K clock signals CK1, . . . , CKK, where K is an integer greater than 1. Each stage 310-1 to 310-P may receive a corresponding single pair among K pairs of the clock and inverted clock signals CK1 and CKB1, . . . , CKK and CKBK. For example, the first stage 310-1 may receive a first clock signal CK1 and a first inverted clock signal CKB1 inverted from the first clock signal CK1. A second stage (between stages 310-1 and 310-(N−K) may receive a second clock signal delayed with respect to the first clock signal CK1 and a second inverted clock signal CKB2 inverted from the second clock signal. A K-th stage may receive a K-th clock signal CKK and a K-th inverted clock signal CKBK inverted from the K-th clock signal CKK, and a (K+1)-th stage may again receive the first clock signal CK1 and the first inverted clock signal CKB1.

The stages 310-(N−K), 310-N and 310-(N+K+L) may sequentially output the gate signals GS(N−K), GS(N) and GS(N+K+L) in response to the K clock signals CK1, . . . , CKK having the sequentially delayed phases and the K inverted clock signals CKB1, . . . , CKBK respectively inverted from the K clock signals CK1, . . . , CKK. For example, as illustrated in FIG. 4, in a case where K is 6, the stages 310-1 to 310-P may receive six clock signals CK1, CK2, CK3, CK4, CK5 and CK6 having sequentially delayed phases, and six inverted clock signals CKB1, CKB2, CKB3, CKB4, CKB5 and CKB6 respectively inverted from the six clock signals CK1-CK6. In this case, for example, the gate signals GS(N−K), GS(N) and GS(N+K+L) may be sequentially output in a manner such that first through sixth stages may output gate signals to first through sixth gate lines during active periods (e.g., high periods in which the clock signals have on voltages) of the first through sixth clock signals CK1-CK6, respectively; seventh through twelfth stages may output gate signals to seventh through twelfth gate lines during active periods of first through sixth inverted clock signals CKB1-CKB6, respectively, and thirteenth through eighteenth stages may output gate signals to thirteenth through eighteenth gate lines again during the active periods of the first through sixth clock signals CK1-CK6. In the case where the six clock signals CK1-CK6 having six different phases (and the six inverted clock signals CKB1-CKB6) are used, one gate signal applied to one gate line may partially overlap in time with five previous gate signals applied to five previous gate lines, and pixels connected to the one gate line may be precharged while the one gate signal overlaps in time with the five previous gate signals. That is, the K clock signals CK1, . . . , CKK having K different phases (and the K inverted clock signals CKB1, . . . CKBK) may be used in order to precharge the pixels.

In the example of FIG. 2, the N-th stage 310-N may output an N-th gate signal GS(N) and an N-th carry signal CR(N) in synchronization with the first clock signal CK1, where N is an integer greater than K. (The N-th gate signal GS(N) and the N-th carry signal CR(N) may be a single pulse output during each frame, where the single pulse is synchronized with one of the pulses of the first clock signal CK1.) Further, the N-th stage 310-N may charge (or pull up) an internal control node in response to a previous ((N−K)-th) carry signal CR(N−K) of the (N−K)-th stage, which is a pulse output in synchronization with a pulse of the first inverted clock signal CKB1 inverted from the first clock signal CK1. In some example embodiments, the first stage 310-1 through a K-th stage (which do not have their previous carry signals) may receive the improved vertical start signal STVP instead of the previous carry signal, and may charge their internal control nodes in response to the improved vertical start signal STVP.

The N-th stage 310-N may then output the N-th gate signal GS(N) and the N-th carry signal CR(N) m response to the first clock signal CK1, and thereafter may discharge (or pull down) the control node in response to a subsequent or next carry signal CR(N+K+L) output in synchronization with a delayed inverted clock signal, where L is an integer greater than 0 and less than K (e.g., the (1+L)-th inverted clock signal CKB(1+L) delayed with respect to the first inverted clock signal CKB1). The delay may be by a phase between 0-180 degrees. For example, if L=2, the delayed inverted clock signal (e.g., the third inverted clock signal CKB3) lags the first inverted clock signal CKB1 by a phase greater than 0 degree and less than 180 degree.

As described above, the N-th stage 310-N outputting the N-th gate signal GS(N) and the N-th carry signal CR(N) in synchronization with the first clock signal CK1 may discharge the control node in response to a subsequent carry signal CR(N+K+L), rather than in response to a next carry signal (i.e., an (N+K)-th carry signal) output in synchronization with the first inverted clock signal CKB1. The subsequent carry signal CR(N+K+L) is output in synchronization with the delayed inverted clock signal (e.g., the third inverted clock signal CKB3) delayed with respect to the first inverted clock signal CKB1. Thereby, the N-th stage 310-N may change the N-th gate signal GS(N) to a low level using the first clock signal CK1 having the low level without a pull-down transistor for pulling down a gate output node at which the N-th gate signal GS(N) is output. In some example embodiments, to perform this operation, the N-th stage 310-N may have a configuration illustrated in FIG. 3.

As illustrated in FIG. 3, the N-th stage 310-N may include an output part 322, a node controlling part 324 and a holding part 326 (where each "part" is understood as a "circuit part"). In response to a voltage at a control node NC, the output part 322 may output, as the N-th gate signal GS(N) and the N-th carry signal CR(N), the clock signal CK1 to each of a gate output node NGO and a carry output node NCO For example, the output part 322 may inch de a first transistor T1 including a gate terminal connected to the control node NC, a first terminal receiving the clock signal CK1, and a second terminal connected to the gate output node NGO; and a second transistor T2 including a gate terminal connected to the control node NC, a first terminal receiving the clock signal CK1, and a second terminal connected to the carry output node NCO. Herein, in the context of transistor terminals, aside from a gate terminal any "first terminal" may be a drain terminal or a source terminal, and any "second terminal" may be a source terminal or a drain terminal. (In the following discussion "$V_{DS}$" will refer to the voltage drop across the first to second terminals of any transistor.) In an example, the output part 322 may further include a capacitor C including a first electrode connected to the control node NC, and a second, opposite electrode connected to the gate output node NGO.

The node controlling part 324 may pull up the control node NC in response to a previous carry signal CR(N−K) that is output in synchronization with an inverted clock signal CKB1 inverted from the clock signal CK1; and may pull down the control node NC in response to a subsequent ca y signal C(N+K+L) that is output in synchronization with a delayed inverted clock signal (in the example of FIGS. 2 and 4, CKB3) delayed with respect to the inverted clock signal CKB1. For example, the node controlling part 324 may include a third transistor T3 including a gate terminal receiving the previous carry signal CR(N−K), where the gate terminal is tied to a first terminal, and a second terminal connected to the control node NC; and a fourth transistor T4 including a gate terminal receiving the subsequent carry signal CR(N+K+L), a first terminal connected to the control node NC, and a second terminal receiving a second off voltage VSS2.

The holding part 326 may hold the control node NC as approximately the second off voltage VSS2 in response to the clock signal CK1 (when transistor T4 is turned on, a voltage of VSS2 minus $V_{DS}$ (T4) may appear at node NC, which approximately equals VSS2). Similarly, the holding part 326 may hold the gate output node NGO as approximately a first off voltage VSS1 (due to transistor T6 being turned on in response to the inverted clock signal CKB1; and may hold the carry output node NCO as the second off voltage VSS2 in response to the inverted clock signal CKB1. For example, the holding part 326 may include a fifth transistor T5 including a gate terminal receiving the clock signal CK1, a first terminal connected to the control node NC, and a second terminal connected to the carry output node NCO, a sixth transistor T6 including a gate terminal receiving the inverted clock signal CKB1, a first terminal connected to the gate output node NGO, and a second terminal receiving the first off voltage VSS1, and a seventh transistor T7 including a gate terminal receiving the inverted clock signal CKB1, a first terminal connected to the carry output node NCO, and a second terminal receiving the second off voltage VSS2. According to example embodiments, the first off voltage VSS1 and the second off voltage VSS2 may be substantially the same voltage, or may be different voltages. For example, the second off voltage VSS2 may have a voltage level lower than a voltage level of the first off voltage VSS1, or vice versa.

FIG. 4 illustrates an example (in the case where K is 6 and L is 2) where the gate driver 300 may receive the six clock signals CK1-CK6 and the six inverted clock signals CKB1-CKB6. Further, the N-th stage 310-N may output the N-th gate signal GS(N) and the N-th carry signal CR(N) in synchronization with the first clock signal CK1, and may receive the subsequent carry signal CR(N+8) output in synchronization with the third inverted clock signal CKB3. Referring to FIGS. 2, 3 and 4, the third transistor T3 of the N-th stage 310-N may pull up the control node NC, in response to the carry signal CR(N−6) that is output in synchronization with the first inverted clock signal CKB1. Thereafter, when the first clock signal CK1 is activated to a high level, the first and second transistors T1 and 12 may output a pulse of the first clock signal CK1 having the high level as the N-th gate signal GS(N) and the N-th carry signal CR(N) in response to a voltage of the pulled-up control node NC. (Note that as shown in FIG. 4, a clock cycle CYC may be a period between successive rising edges, or between successive falling edges, of any of the clock signals such as CK1. For approximately half of a clock cycle CYC, the clock signal CK1 has a high level, which may be referred to herein as an on voltage, and during the other half, it has a low level, which may be referred to as an off voltage. Each inverted clock signal such as CKB1 has the same clock cycle CYC.)

Subsequently, the N-th gate signal GS(N) may be changed to a low level responsive to a filling edge of the first clock signal CK1, without a pull-down transistor for pulling down the gate output node NGO. To this end, the N-th stage 310-N may pull down the control node NC in response to an (N+K+L)-th carry signal CR(N+K+L) that is output in synchronization with the third inverted clock signal CKB3 delayed with respect to the first inverted clock signal CKB1. In the example of FIG. 4 where K=6 and L=2, CR(N+K+L)=CR (N+8). In this regard, during a period between a rising edge of the first inverted clock signal CKB1 and a rising edge of the third inverted clock signal CKB3, the first clock signal CK1 has transitioned to the low level; thus, the first and second transistors T1 and T2 may output the first clock signal CK1 having the low level to the gate output node NGO and the carry output node NCO in response to the voltage of the control node NC being pulled down. For instance, the fourth transistor T4 may pull down the control node NC, in response to the (N+8)-th carry signal CR(N+8), and the first and second transistors T1 and T2 may be turned off in response to a voltage of the pulled-down control node NC. The sixth and seventh transistors T6 and T7 may hold the gate output node NGO and the carry output node NCO as approximately the first off voltage VSS1 and the second off voltage VSS2 in response to the first inverted clock signal CKB1, respectively. In some examples, a size of the sixth transistor T6 may be at least one order of magnitude less than a size of the first transistor T1. In an example, the size of the sixth transistor T6 may be even smaller, e.g., less than or equal to one hundredth of a size of the first transistor T1. In these cases, the N-th gate signal GS(N) may be changed from the high level to the low level mainly due to the action of the first transistor T1 and the first clock signal CK1 having the low level, rather than by the sixth transistor T6 and the first off voltage VSS1. Further, the fifth transistor T5 may connect the control node NC to the carry output node NCO in response to the first clock signal CK1 to allow the control node NC to be held at approximately the second off voltage VSS2 of the carry output node NCO.

As illustrated in FIGS. 2 through 4, the gate driver 300 may receive the K clock signals CK1, . . . , CKK and the K inverted clock signals CKB1, . . . , CKBK, the carry signal CR(N−K) for charging the control node NC may be propagated with an interval of K stages, and the carry signal CR(N+K+L) for discharging the control node NC may be propagated with an interval of K+L, stages. For example, the control node NC of the N-th stage 310-N may be charged in response to the (N−K)-th carry signal CR(N−K) of the (N−K)-th stage 310-(N−K), and the N-th carry signal CR(N) may be used to charge the control node NC of an (N+K)-th stage. Further, the control node NC of the N-th stage 310-N may be discharged in response to the (N+K+L)-th carry signal CR(N+K+L) of the (N+K+L)-th stage 310-(N+K+L), and the N-th carry signal CR(N) may be used to discharge the control node NC of an (N−K−L)-th stage. As described above, in a case where the carry propagation stage interval (e.g., the interval of the K stages) for charging the control node NC and the carry propagation stage interval the interval of the K+L, stages) for discharging the control node NC are different from each other, if an operating mode of the display device 100 is changed during a frame period, the gate driver 300 may perform an abnormal operation that simultaneously outputs a plurality of gate signals, and the display device 100 may be shut down by an over-current protection (OCP) function of the power management circuit 600. Alternatively, there may be a case where the carry propagation stage interval for charging the control node NC and the carry propagation stage interval for discharging the control node NC are the same interval of K stages. In this case, even if the operating mode of the display device 100 is changed when the control node NC of the N-th stage 310-N is in a charged state, the control node NC of the N-th stage 310-N may be discharged in response to the (N+K)-th carry signal CR(N+K) of the (N+K)-th stage of which the control node NC is charged in response to the N-th carry signal CR(N) of the N-th stage 310-N. Accordingly, the abnormal operation of the gate driver 300 may be automatically corrected.

However, consider the case where the carry propagation stage interval for charging the control node NC is the interval of K stages, and the carry propagation stage interval for discharging the control node NC is the interval of K+L stages. Here if the operating mode of the display device 100 is changed when the control node NC of the N-th stage 310-N is in the charged state, the control node NC of the (N+K)-th stage may be undesirably charged by the N-th carry signal CR(N), and the (N+K)-th carry signal CR(N+K) of the (N+K)-th stage may be applied to an (N−L)-th stage. Thus, the (N+K)-th carry signal CR(N+K) of the (N+K)-th stage may not be used to discharge the control node NC of the N-th stage 310-N. Without the use of preventative measures such as those described below, as time goes on, the number of gate signals that are simultaneously output may be increased, an over-current may occur, and thus the display device 100 may be shut down by the OCP function of the power management circuit 600. Further, the N-th carry signal CR(N) of the N-th stage 310-N may undesirably discharge the control node NC of an (N−K−L)-th stage, and thus the control node NC of an (N−2K−2L)-th stage receiving an (N−K−L)-th carry signal of the (N−K−L)-th stage may not be discharged.

To prevent this abnormal operation of the gate driver 300, the display device 100 according to example embodiments may change both of the clock signal CK and the inverted clock signal CKB (i.e., all of the individual clock and inverted clock signals thereof) to an on voltage in a mode transition period in which the operating mode of the display device 100 is changed. The control nodes NC, the gate output nodes NGO and the carry output nodes NCO of the plurality of stages 310-(N−K), 310-N and 310-(N−K+L) may each be discharged using the clock signal CK and the inverted clock signal CKB each having the on voltage. The discharging of these nodes prevents simultaneous output of gate signals that would otherwise cause the over-current condition and the resulting OCP function to be activated.

Figure 5:
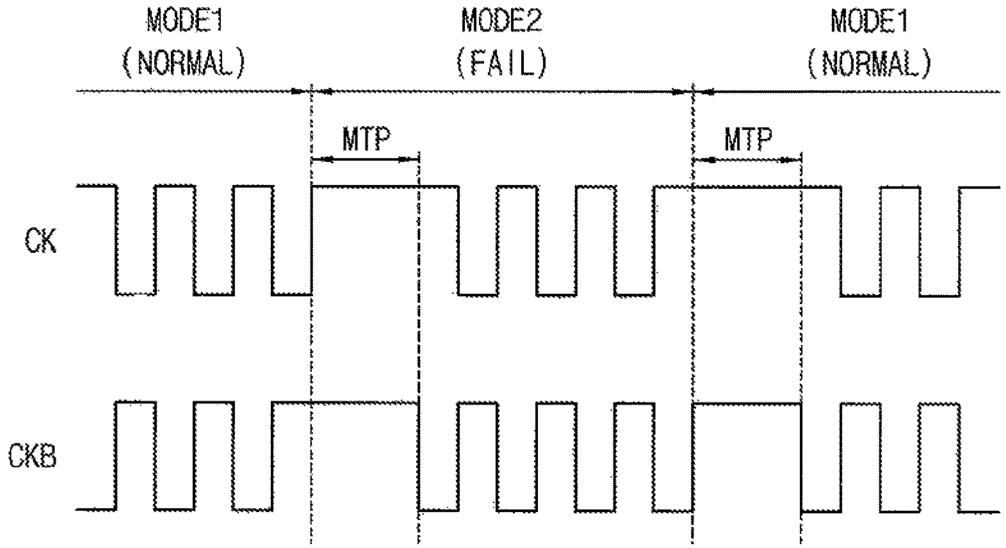
FIG. 5 is a timing diagram illustrating a clock signal and an inverted clock signal when an operating mode of a display device is changed.

For example, as illustrated in FIG. 5, during a frame period in which the display device 100 operates in a first mode MODE1 (e.g., a normal mode), the operating mode of the display device 100 may be changed to a second mode MODE2 (e.g., a fail mode). In this case, in a mode transition period MTP, which is an initial period of the second mode MODE2 in which the data signal DATA is not output from the timing controller 200 to the data driver 500, the power management circuit 600 may provide, as the clock signal CK (e.g., the K clock signals CK1, . . . , CKK) and the inverted clock signal CKB (e.g., the K inverted clock signals CKB1, . . . , CKBK), the on voltage to the gate driver 300. The holding parts 326 of all stages 310-(N−K), 310-N and 310-(N−K+L) of the gate driver 300 may discharge the control nodes NC, the gate output nodes NGO and the carry output nodes NCO in response to the clock signal CK having the on voltage and the inverted clock signal CKB having the on voltage. In an example, each of the stages 310-1 to 310-P may have the configuration of FIG. 3, and each of the holding parts 326 of these stages may likewise discharge the control nodes NC, the gate output nodes NGO and the carry output nodes NCO. For example, the sixth and seventh transistors T6 and T7 may discharge the gate output nodes NGO and the carry output nodes NCO to the first off voltage VSS1 and the second off voltage VSS2 in response to the inverted clock signal CKB having the on voltage, respectively. Further, the fifth transistors T5 may be turned on in response to the clock signal CK having the on voltage, and the control nodes NC may be discharged to the second off voltage VSS2 through the turned-on fifth and seventh transistor T5 and T7.

As described above, the control nodes NC, the gate output nodes NGO and the carry output nodes NCO may be discharged using the clock signal CK having the on voltage and the inverted clock signal CKB having the on voltage, and thus the abnormal operation of the gate driver caused by the undesirably charged control nodes NC may be prevented. Further, in a case where the operating mode of the display device 100 is changed from the second mode MODE2 to the first mode MODE1, also in a mode transition period MTP, which is an initial period of the first mode MODE1 in which the data signal DATA is not output from the timing controller 200 to the data driver 500, the control nodes NC, the gate output nodes NGO and the carry output nodes NCO may be discharged using the clock signal CK and the inverted clock signal CKB each having the on voltage. Thus, the abnormal operation of the gate driver 300 may be prevented.

In either of the above cases, during the MTP period, the clock signal CK and the inverted clock signal CKB may each have the on voltage concurrently throughout the MTP period, as illustrated in FIG. 5. In other examples, the clock signal CK and the inverted clock signal CKB may concurrently have the on voltage for less than the duration of the MTP period, but for at least one clock cycle CYC (illustrated in FIG. 4).

A normal mode may be a mode in which a normal image is displayed based on the input image data IMG received from the external device (e.g., the CPU). A fail mode may be a mode in which a black image or a pattern image is displayed based on black data or pattern data stored in the display device 100. In some embodiments, the mode transition period MTP may be the initial period (or a masking period) in which the data signal DATA is not output from the timing controller 200 to the data driver 500 when the operating mode of the display device 100 is changed between the normal mode and the fail mode In other embodiments, the mode transition period MTP may be the initial period (or the masking period) in which the data signal DATA is not output from the timing controller 200 to the data driver 500 when the operating mode of the display device 100 is changed between a first mode corresponding to a first frame rate or a first resolution and a second mode corresponding to a second frame rate different from the first frame rate or a second resolution different from the first resolution.

Figure 6A:
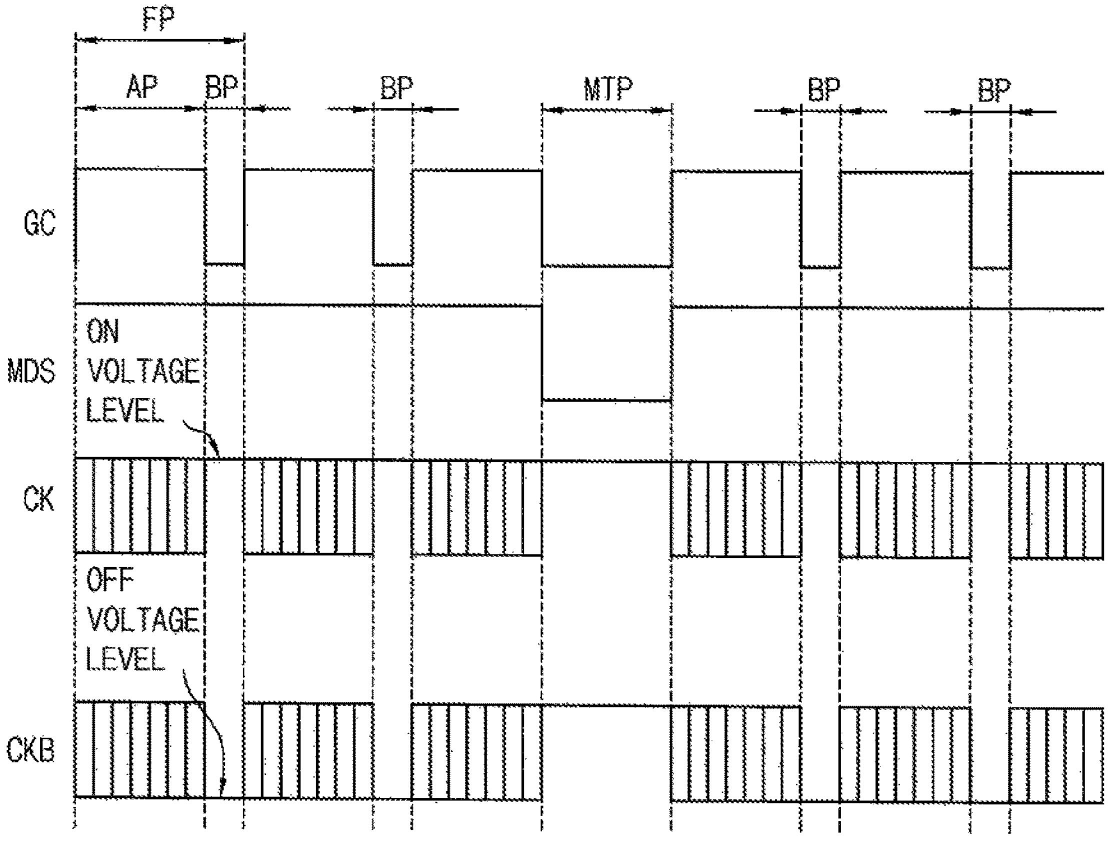
FIGS. 6A, 6B and 6C are respective timing diagrams for describing examples where a power management circuit included in a display device of FIG. 1 outputs an on voltage as a clock signal and an inverted clock signal in response to a masking detection signal.

In some example embodiments, as illustrated in FIG. 6A, for the power management circuit 600 to generate the clock signal CK having the on voltage and the inverted clock signal CKB having the on voltage in the mode transition period MTP, the timing controller 200 may transfer a masking detection signal MDS that is activated during the mode transition period MTP to the power management circuit 600. For example, the masking detection signal MDS may be a signal representing the initial period in which the data signal DATA is not output from the timing controller 200 to the data driver 500 at mode switching. In an example, when an error occurs in the input image data IMG, the timing controller 200 may change the operating mode of the display device 100 from the normal mode to the fail mode, and may transfer the masking detection signal MDS activated during the mode transition period MTP to the power management circuit 600. The power management circuit 600 may change the clock signal CK and the inverted clock signal CKB to the on voltage in response to the masking detection signal MDS.

In an example, as illustrated in FIG. 6A, both of the clock signal CK and the inverted clock signal CKB may be changed to the on voltage in the mode transition period MTP, but, in a blank period BP (e.g., a vertical blank period) of each frame period FP, the clock signal CK and the inverted clock signal CKB may be maintained as last voltages in an active period AP. In the blank period BP, the clock signal CK may be maintained as an on voltage and the inverted clock signal CKB may be maintained as an off voltage (as illustrated in FIG. 6A), or vice versa; or both CK and CKB may be set to the same voltage level.

In a case where both the clock signal CK and the inverted clock signal CKB have the on voltage not only in the mode transition period MTP but also in the blank period BP, high voltage stresses to the transistors T5, T6 and T7 of the holding parts 326 may be accumulated, and deterioration of the transistors T5, T6 and T7 may be intensified. However, in the display device 100 according to example embodiments, both the clock signal CK and the inverted clock signal CKB may have the on voltage in the mode transition period MTP, but the clock signal CK and the inverted clock signal CKB in the blank period BP of each frame period FP may be maintained as the last voltages in the active period AP. Accordingly, the high voltage stresses to the transistors T5, T6 and T7 of the holding parts 326 may not be accumulated.

Figure 6B:
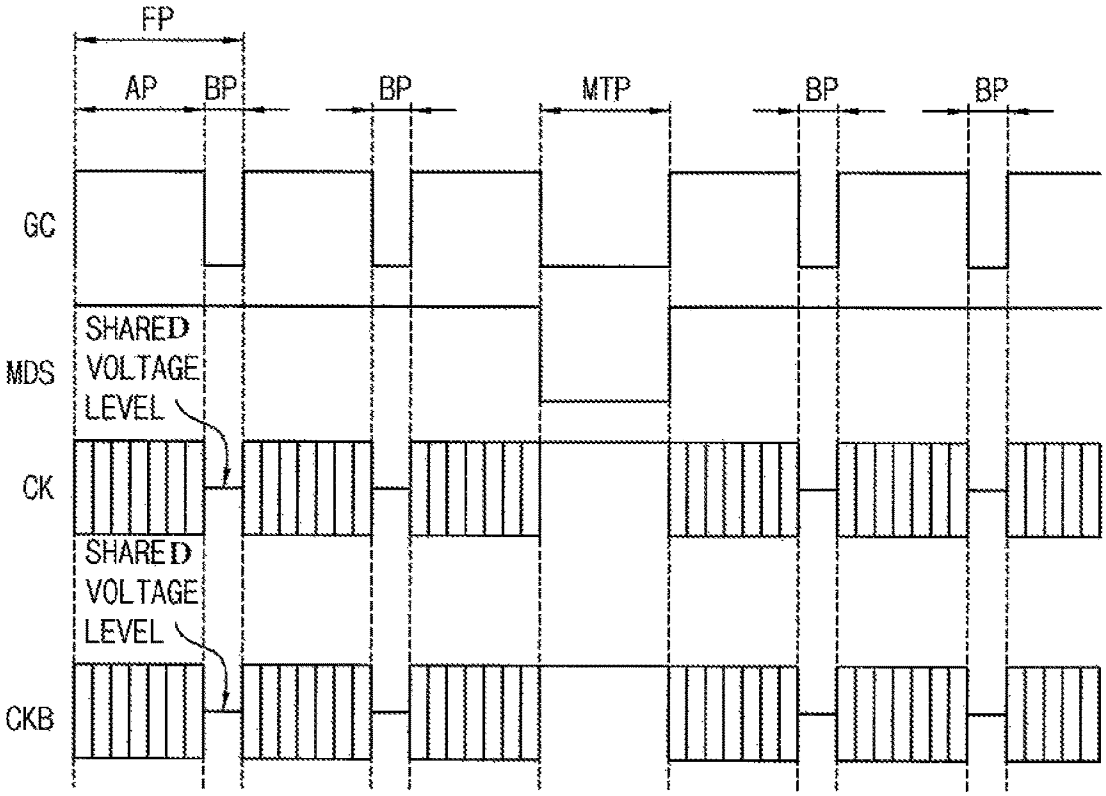

In another example, as illustrated in FIG. 6B, both of the clock signal CK and the inverted clock signal CKB may be changed to the on voltage in the mode transition period MTP, but, in the blank period BP of each frame period FP, the clock signal CK and the inverted clock signal CKB may have a charge shared voltage. For instance, to reduce power consumption in the blank period BP of each frame period FP, the power management circuit 600 may generate the charge shared voltage by performing charge sharing, and may output the charge shared voltage as the clock signal CK and the inverted clock signal CKB. Accordingly, the power consumption may be reduced, and the high voltage stresses to the transistors T5, T6 and T7 of the holding parts 326 may not be accumulated. The charge shared voltage may have a voltage level in between the on voltage and an off voltage of the clock signal, e.g., approximately midway in between.

Figure 6C:
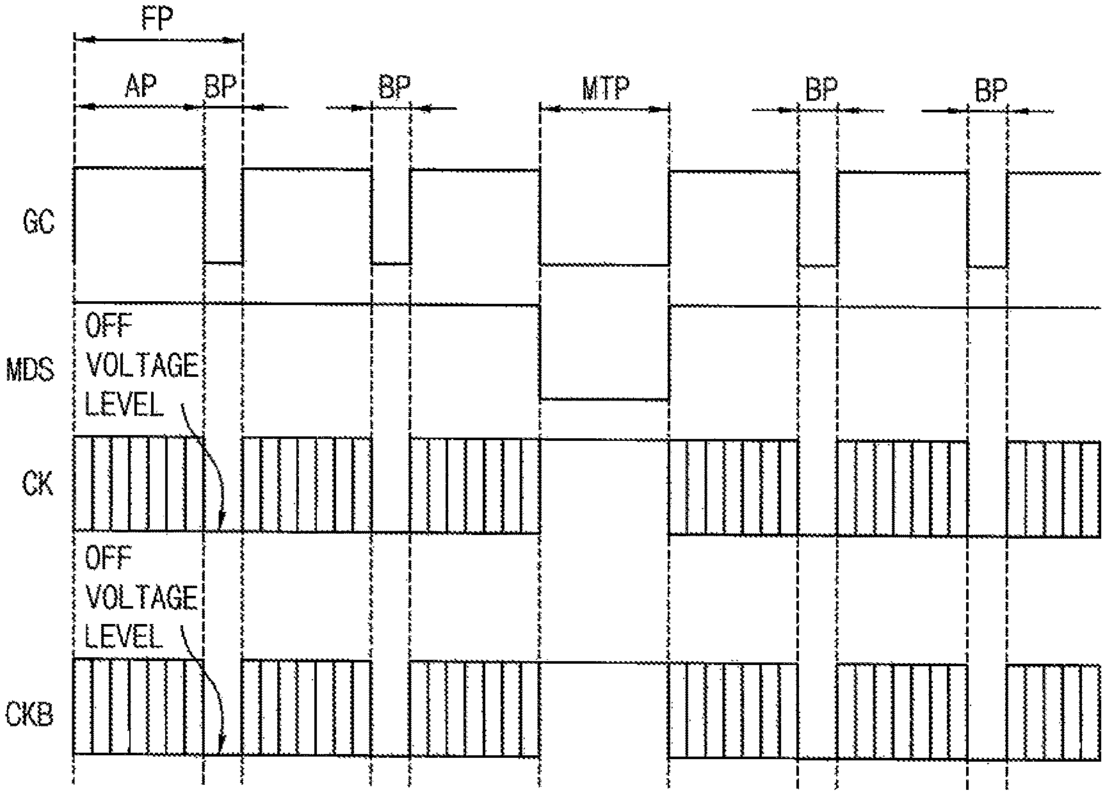

In still another example, as illustrated in FIG. 6C, both of the clock signal CK and the inverted clock signal CKB may be changed to the on voltage in the mode transition period MTP, but, in the blank period BP of each frame period FP, at least one of the clock signal CK and the inverted clock signal CKB may have an off voltage. Accordingly, the high voltage stresses to the transistors T5, T6 and T7 of the holding parts 326 may not be accumulated.

Although FIGS. 6A through 6C illustrate examples where the timing controller 200 may inform the power management circuit 600 of the mode transition period MTP by transferring the masking detection signal MDS, alternative ways of informing the power management circuit 600 of the mode transition period MTP are available. In some embodiments, the timing controller 200 may transfer a command representing the mode transition period MTP to the power management circuit 600 through an inter-integrated circuit (I2C) communication. In response to this command, the power management circuit 600 may change the clock signal CK and the inverted clock signal CKB to the on voltage.

As described above, the display device 100 according to example embodiments may discharge the control nodes NC, the gate output nodes NGO and the carry output nodes NCO of the plurality of stages 310-(N−K), 310-N and 310-(N−K+L) using the clock signal CK having the on voltage and the inverted clock signals CKB having the on voltage in the mode transition period MTP, thereby preventing the abnormal operation of the gate driver 300.

Figure 7:
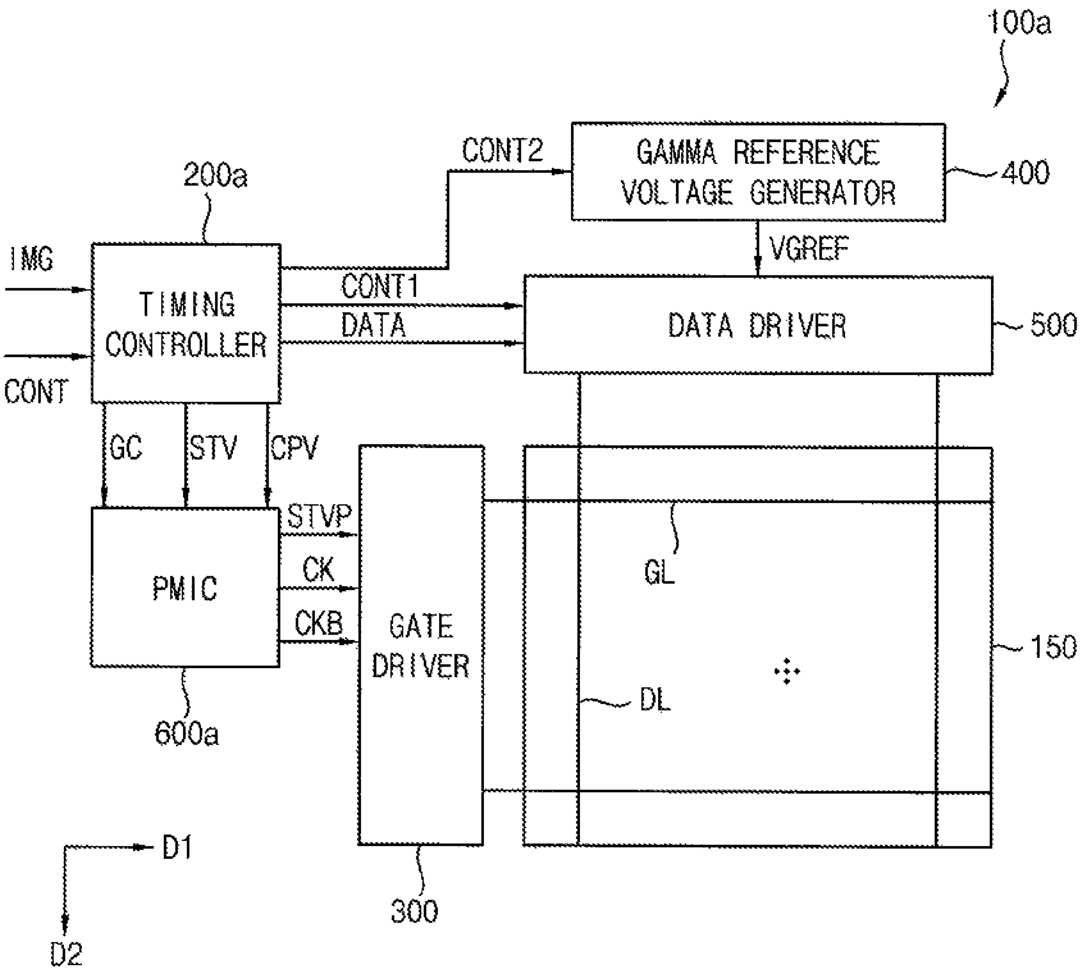
FIG. 7 is a block diagram illustrating a display device according to example embodiments.
Figure 8:
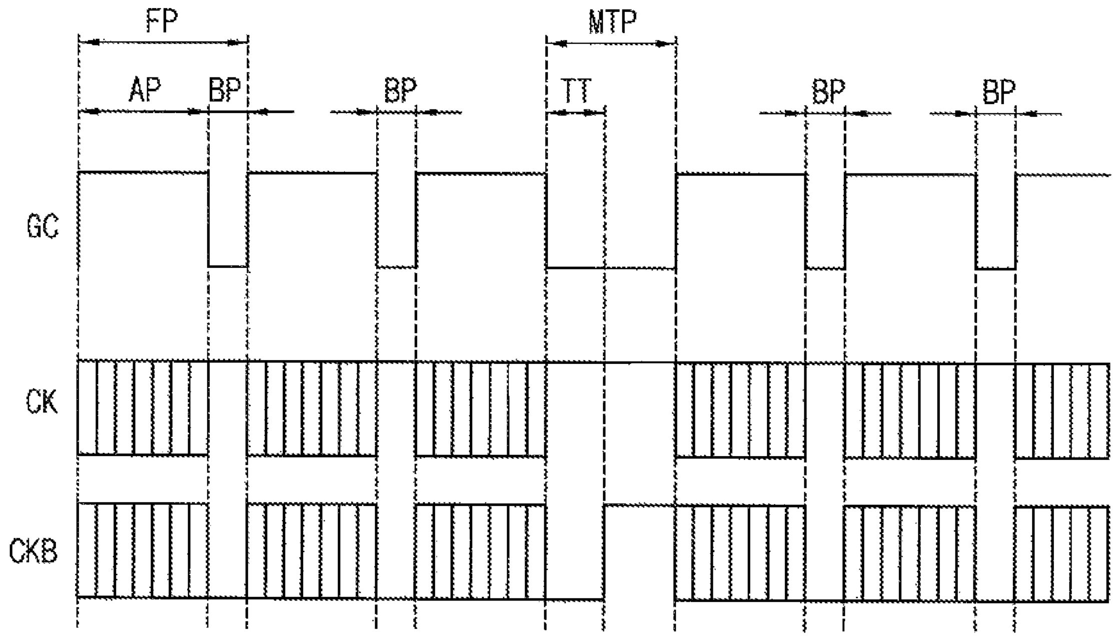
FIG. 8 is a timing diagram for describing an example where a power management circuit included in a display device of FIG. 7 outputs an on voltage as a clock signal and an inverted clock signal according to a length of an inactive period of a gate control signal.

FIG. 7 is a block diagram illustrating a display device according to example embodiments, and FIG. 8 is a timing diagram for describing an example where a power management circuit included in a display device of FIG. 7 outputs an on voltage as a clock signal and an inverted clock signal according to a length of an inactive period of a gate control signal.

Referring to FIG. 7, a display device 100*a* may include a display panel 150, a timing controller 200*a*, a gate driver 300, a gamma reference voltage generator 400, a data driver 500 and a power management circuit 600*a*. The display device 100*a* of FIG. 7 may have substantially the same configuration and operation as a display device 100 of FIG. 1, except that the power management circuit 600*a* may not receive a masking detection signal MDS and may change a clock signal CK and an inverted cloak signal CKB to an on voltage by analyzing a gate control signal GC.

Referring to FIGS. 7 and 8, the timing controller 200*a* may transfer a gate control signal GC representing that the clock signal CK and the inverted clock signal CKB are to be, toggled to the power management circuit 600*a*. For example, the gate control signal GC may have a high level during an active period AP of each frame period FP, and may have a low level during a blank period BP or a mode transition period MTP. The mode transition period MTP may be longer than one blank period BP. Thus, the power management circuit 600*a* may distinguish the mode transition period MTP from the blank period BP according to a time length of an inactive period (or a low level period) of the gate control signal GC. In some example embodiments, the power management circuit 600*a* may determine the inactive period of the gate control signal GC as the mode transition period MTP when a time of the inactive period of the gate control signal GC reaches a predetermined threshold time TT. Once the inactive period of the gate control signal GC is determined as the mode transition period MTP, the power management circuit 600*a* may change the clock signal CK and the inverted clock signal CKB to the on voltage. Accordingly, control nodes, gate output nodes and carry output nodes of stages of the gate driver 300 may be discharged in response to the clock signal CK having the on voltage and the inverted clock signals CKB having the on voltage, and thus an abnormal operation of the gate driver 300 may be prevented.

Figure 9:
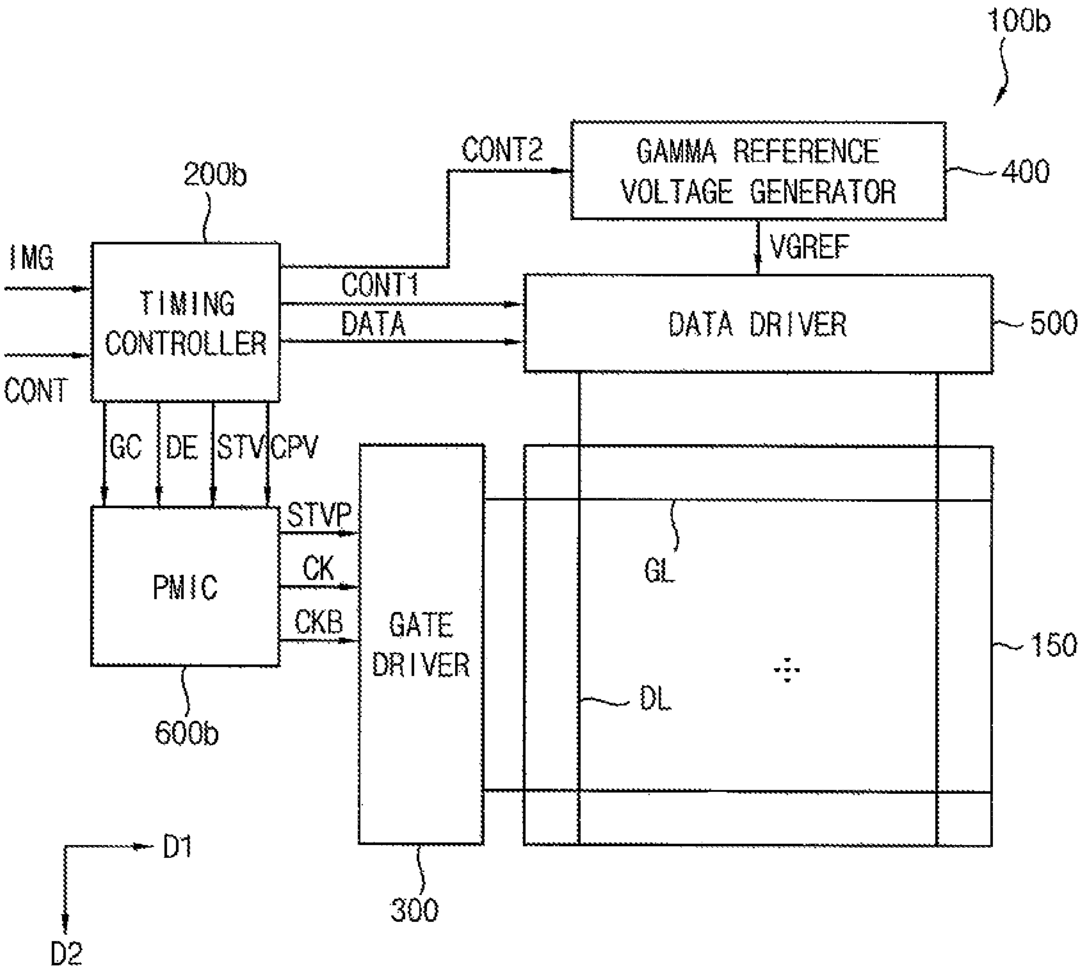
FIG. 9 is a block diagram illustrating a display device according to example embodiments.

FIG. 9 is a block diagram illustrating a display device, 100*b*, according to example embodiments. Display device 100*b* may include a display panel 150, a timing controller 200*b*, a gate driver 300, a gamma reference voltage generator 400, a data driver 500 and a power management circuit 600*b*. The display device 100*b* of FIG. 9 may have substantially the same configuration and operation as a display device 100 of FIG. 1 but the power management circuit 600*b* change a clock signal CK and an inverted clock signal CKB to an on voltage during an MTP period by analyzing a data enable signal DE, rather than receiving a masking detection signal MDS for this purpose.

The timing controller 200*b* may transfer a data enable signal DE representing that a data signal DATA is output to the data driver 500. In some example embodiments, the data enable signal DE transferred to the power management circuit 600*b* may be an internal signal generated by the timing controller 200*b* based on an input data enable signal included in an input control signal CONT. In other example embodiments, the timing controller 200*b* may provide the power management circuit 600*b* with the input data enable signal included in the input control signal CONT as is, or the power management circuit 600*b* may receive the input data enable signal directly from an external device (e.g., a GPU).

The power management circuit 600*b* may count a time duration of the data enable signal DE, and may change the clock signal CK and the inverted clock signal CKB to the on voltage when the counted data enable signal DE time duration exceeds a predetermined normal range. The time duration or the count of the data enable signal DE may refer to a time after which the data enable signal DE has risen to and has remained at a logic high level. For example, when the data enable signal DE count exceeds a predetermined normal range, the power management circuit 600*b* may determine that an operating mode is to be changed from a normal mode to a fail mode, and may output the clock signal CK and the inverted clock signal CKB each having the on voltage for a predetermined time. Accordingly, control nodes, gate output nodes and carry output nodes of stages of the gate driver 300 may be discharged in response to the clock signal CK and inverted clock signal CKB each having the on voltage, and thus an abnormal operation of the gate driver 300 may be prevented.

Figure 10:
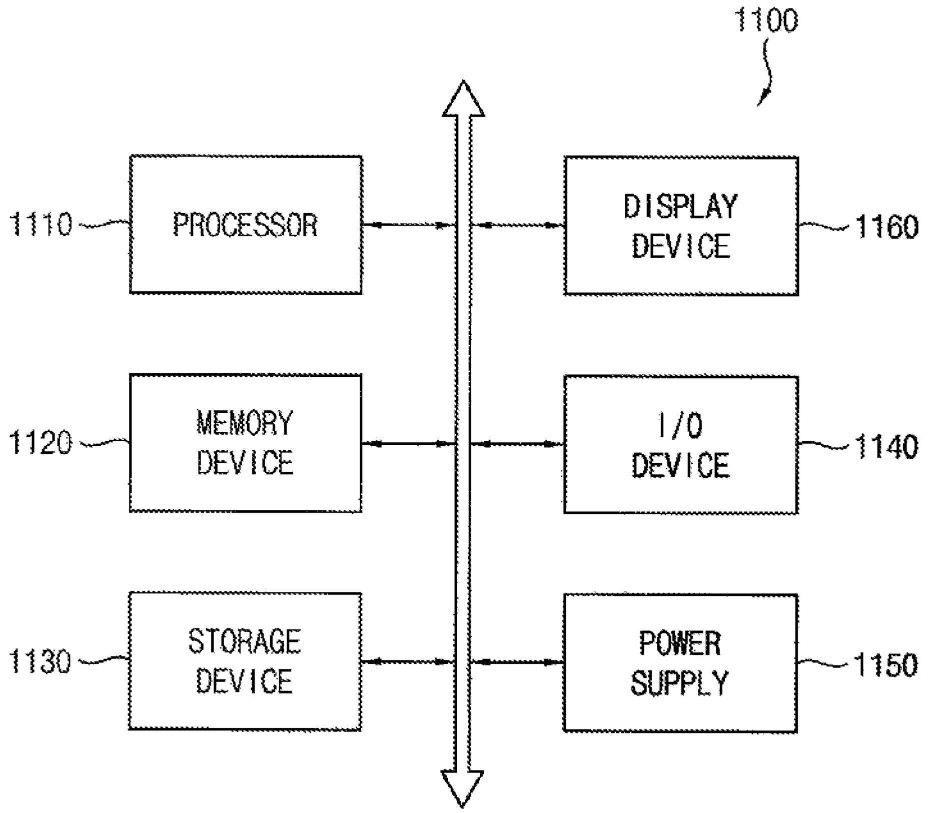
FIG. 10 is a block diagram illustrating an electronic device including a display device according to example embodiments.

FIG. 10 is a block diagram illustrating an electronic device, 1100 including a display device according to example embodiments. Electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc., and be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may comprise an input device such as a keyboard, a keypad, a mouse, a touch screen, etc, and an output device such as a printer, a speaker, etc. The power supply 1150 may supply power for operations of the electronic device 1100. The display device 1160 may be connected to other components through the buses or other communication links.

The display device 1160 may discharge control nodes, gate output nodes and carry output nodes of stages of a gate driver using a clock signal having an on voltage and an inverted clock signal having the on voltage, thereby preventing an abnormal operation of the gate driver. Examples of the display device 1160 include any of the display devices 100, 100*a*, 100*b* described above.

The electronic device 1100 according to example embodiments may be any electronic device including the display device 1160, such as a digital television (TV), a 3D TV, a personal computer (PC), a home appliance, a laptop computer, a cellular phone, a smart phone, a tablet computer, a wearable device, a personal digital assistant (PDA), a portable multimedia player (PMP), a digital camera, a music player, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the appended claims and their equivalents.

What is claimed is:

1. A gate driver included in a display device, the gate driver comprising a plurality of stages that sequentially output a plurality of gate signals, at least some of the plurality of stages comprising:

an output circuit part configured to output a gate signal of the plurality of gate signals to a gate output node and a carry signal to a carry output node in response to a voltage of a control node, the gate signal and the carry signal each having a pulse synchronized with a pulse of a clock signal;

a node controlling circuit part configured to pull up the control node in response to a previous carry signal output in synchronization with an inverted clock signal inverted from the clock signal, and to pull down the control node in response to a subsequent carry signal output in synchronization with a delayed inverted clock signal delayed with respect to the inverted clock signal; and a holding circuit part configured to hold the control node at a second off voltage in response to the clock signal, to hold the gate output node at a first off voltage in response to the inverted clock signal, and to hold the carry output node at the second off voltage in response to the inverted clock signal, wherein, in a mode transition period, the holding circuit parts of the at least some of the plurality of stages receive the clock signal having an on voltage maintained throughout at least one clock cycle, and the inverted clock signal having the on voltage maintained throughout the at least one clock cycle, and in response, discharge the control nodes, the gate output nodes and the carry output nodes.

2. The gate driver of claim 1, wherein, when an operating mode of the display device is changed from a first mode to a second mode, the mode transition period corresponds to an initial period of the second mode in which no data signal is output.

3. The gate driver of claim 2, wherein the first mode is a normal mode in which a normal image is displayed based on input image data received from an external device, and the second mode is a fail mode in which a black image or a pattern image is displayed based on black data or pattern data stored in the display device.

4. The gate driver of claim 1, wherein the on voltage is maintained throughout the mode transition period.

5. The gate driver of claim 2, wherein the first mode corresponds to a first frame rate or a first resolution, and the second mode corresponds to a second frame rate different from the first frame rate or a second resolution different from the first resolution.

6. The gate driver of claim 1, wherein, in a blank period, at least one of the clock signal and the inverted clock signal has an off voltage.

7. The gate driver of claim 1, wherein, in a blank period, the clock signal and the inverted clock signal have a charge shared voltage having a voltage level in between the on voltage and an off voltage of the clock signal.

8. The gate driver of claim 1, wherein the clock signal is one of K clock signals received by the gate driver the K clock signals having sequentially delayed phases, and the inverted clock signal is one of K inverted clock signals that are respectively inverted from the K clock signals, where K is an integer greater than 1, and wherein an N-th one of the plurality of stages receives, as the previous carry signal, the carry signal of an (N−K)-th one of the plurality of stages, and receives, as the subsequent carry signal, the carry signal of an (N+K+L)-th one of the plurality of stages, where N is an integer greater than K, and L is an integer greater than 0 and less than K.

9. The gate driver of claim 1, wherein the output circuit part comprises:

a first transistor including a gate terminal connected to the control node, a first terminal receiving the clock signal, and a second terminal connected to the gate output node;

a second transistor including a gate terminal connected to the control node, a first terminal receiving the clock signal, and a second terminal connected to the carry output node; and a capacitor including a first electrode connected to the control node, and a second electrode connected to the gate output node, wherein the node controlling circuit part comprises:

a third transistor including a gate terminal receiving the previous carry signal, a first terminal receiving the previous carry signal, and a second terminal connected to the control node; and a fourth transistor including a gate terminal receiving the subsequent carry signal, a first terminal connected to the control node, and a second terminal receiving the second off voltage, and wherein the holding circuit part comprises:

a fifth transistor including a gate terminal receiving the clock signal, a first terminal connected to the control node, and a second terminal connected to the carry output node;

a sixth transistor including a gate terminal receiving the inverted clock signal, a first terminal connected to the gate output node, and a second terminal receiving the first off voltage; and a seventh transistor including a gate terminal receiving the inverted clock signal, a first terminal connected to the carry output node, and a second terminal receiving the second off voltage.

10. A gate driver included in a display device, the gate driver comprising a plurality of stages that sequentially output a plurality of gate signals, at least some of the plurality of stages comprising:

a first transistor including a gate terminal connected to a control node, a first terminal receiving a clock signal, and a second terminal connected to a gate output node;

a second transistor including a gate terminal connected to the control node, a first terminal receiving the clock signal, and a second terminal connected to a carry output node;

a third transistor including a gate terminal receiving a previous carry signal having a pulse output in synchronization with a pulse of an inverted clock signal inverted from the clock signal, a first terminal receiving the previous carry signal, and a second terminal connected to the control node;

a fourth transistor including a gate terminal receiving a subsequent carry signal that is output in synchronization with a delayed inverted clock signal delayed with respect to the inverted clock signal, a first terminal connected to the control node, and a second terminal receiving a second off voltage;

a fifth transistor including a gate terminal receiving the clock signal, a first terminal connected to the control node, and a second terminal connected to the carry output node;

a sixth transistor including a gate terminal receiving the inverted clock signal, a first terminal connected to the gate output node, and a second terminal receiving a first off voltage; and a seventh transistor including a gate terminal receiving the inverted clock signal, a first terminal connected to the carry output node, and a second terminal receiving the second off voltage, wherein, in a mode transition period, in the at least some of the plurality of stages, the fifth transistors discharge the control nodes in response to the clock signal having an on voltage, and, in response to the inverted clock signal having the on voltage, the sixth transistors discharge the gate output nodes and the seventh transistors discharge the carry output nodes.

11. The gate driver of claim 10, wherein, when an operating mode of the display device is changed from a normal mode in which a data signal from externally provided image data is output to a display panel of the display device, to a fail mode in which a data signal from externally provided image data is not output to the display panel, the mode transition period corresponds to an initial period of the fail mode in which no data signal is output to the display panel.

12. The gate driver of claim 10, wherein the clock signal is one of K clock signals received by the gate driver, the K clock signals having sequentially delayed phases, and the inverted clock signal is one of K inverted clock signals received by the gate driver and respectively inverted from the K clock signals, where K is an integer greater than 1, and wherein an N-th one of the plurality of stages receives, as the previous carry signal, the carry signal of an (N−K)-th one of the plurality of stages, and receives, as the subsequent carry signal, the carry signal of an (N+K+L)-th one of the plurality of stages, where N is an integer greater than K, and L is an integer greater than 0 and less than K.

13. The gate driver of claim 10, wherein a size of the sixth transistor is less than one order of magnitude of a size of the first transistor.

14. The gate driver of claim 10, wherein the on voltage of each of the clock signal and the inverted clock signal is maintained continuously throughout the mode transition period.

15. A display device comprising:

a display panel including a plurality of pixels;

a data driver configured to apply data voltages to the pixels;

a timing controller configured to generate a vertical clock signal;

a power management circuit configured to generate a clock signal and an inverted clock signal based on the vertical clock signal; and a gate driver including a plurality of stages that sequentially output a plurality of gate signals to the pixels in response to the clock signal and the inverted clock signal, wherein, in a mode transition period, the power management circuit outputs each of the clock signal and the inverted clock signal at an on voltage maintained throughout at least one clock cycle, which causes the plurality of stages to discharge control nodes, gate output nodes and carry output nodes of the plurality of stages, wherein the power management circuit outputs each of the clock signal and the inverted clock signal at the on voltage maintained throughout the mode transition period, and wherein the mode transition period is a period between a normal mode in which a normal image is displayed based on input image data received from an external device, and a fail mode in which a black image or a pattern image is displayed based on black data or pattern data stored in the display device.

16. The display device of claim 15, wherein the timing controller transfers a masking detection signal to the power management circuit, and the masking detection signal is activated during the mode transition period, and wherein the power management circuit changes the clock signal and the inverted clock signal to the on voltage in response to the masking detection signal.

17. The display device of claim 15, wherein the timing controller transfers a command to the power management circuit through an inter-integrated circuit (I2C) communication, and wherein the power management circuit changes the clock signal and the inverted clock signal to the on voltage in response to the command.

18. The display device of claim 15, wherein the timing controller transfers a gate control signal representing that the clock signal and the inverted clock signal are to be toggled, to the power management circuit, and wherein the power management circuit changes the clock signal and the inverted clock signal to the on voltage when a time of an inactive period of the gate control signal reaches a predetermined threshold time.

19. The display device of claim 15, wherein the timing controller transfers a data enable signal representing that a data signal is output to the data driver, and wherein the power management circuit counts a time duration of the data enable signal, and changes the clock signal and the inverted clock signal to the on voltage when the counted time duration of the data enable signal exceeds a predetermined normal range.

* * * * *